July 14, 1959 W. F. ERICKSON 2,894,525
COMBINED FLOW CONTROL AND RELIEF VALVE
Filed April 15, 1954 2 Sheets-Sheet 1
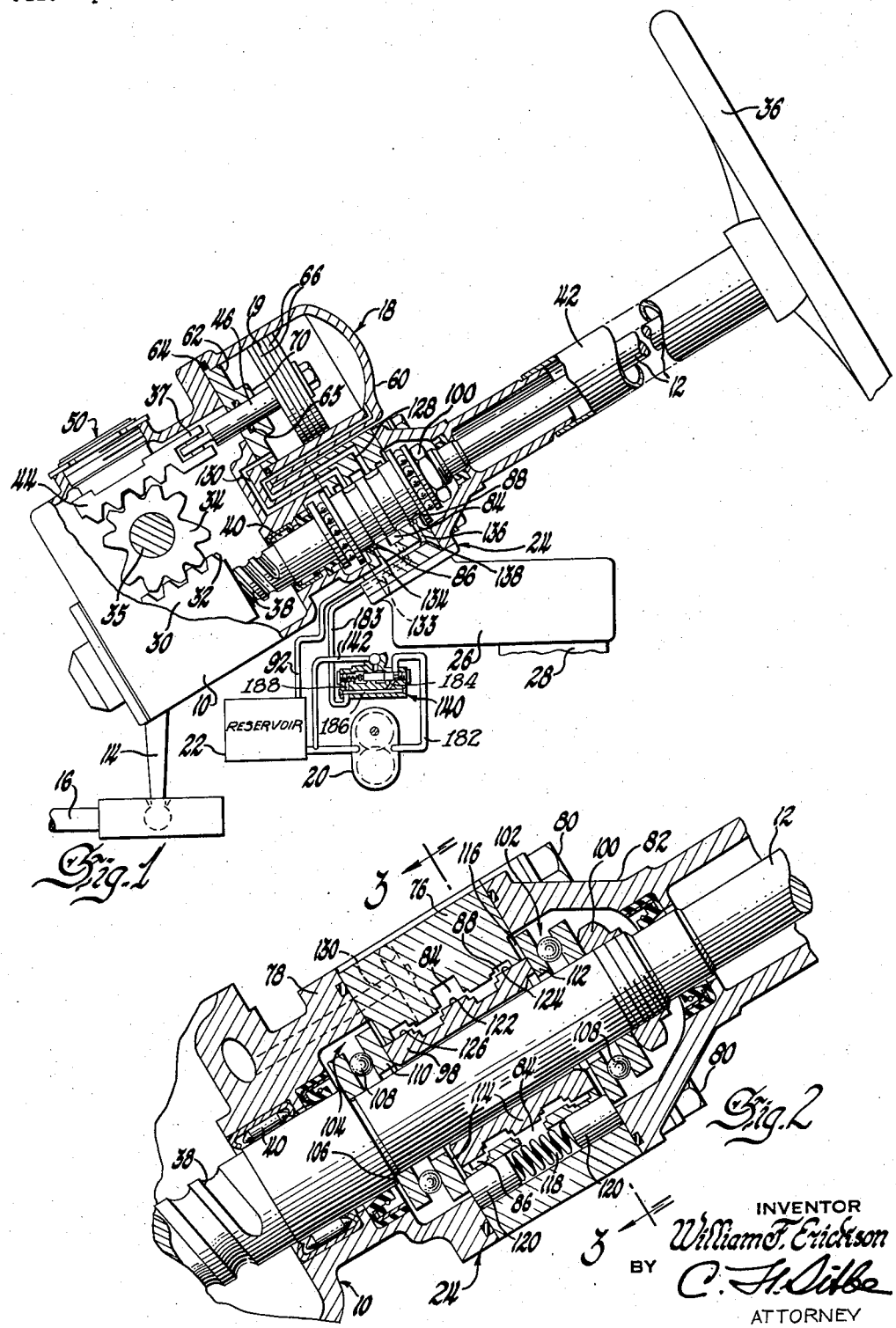
INVENTOR
William F. Erickson
BY
ATTORNEY July 14, 1959 — W. F. ERICKSON — 2,894,525
COMBINED FLOW CONTROL AND RELIEF VALVE
Filed April 15, 1954 — 2 Sheets-Sheet 2
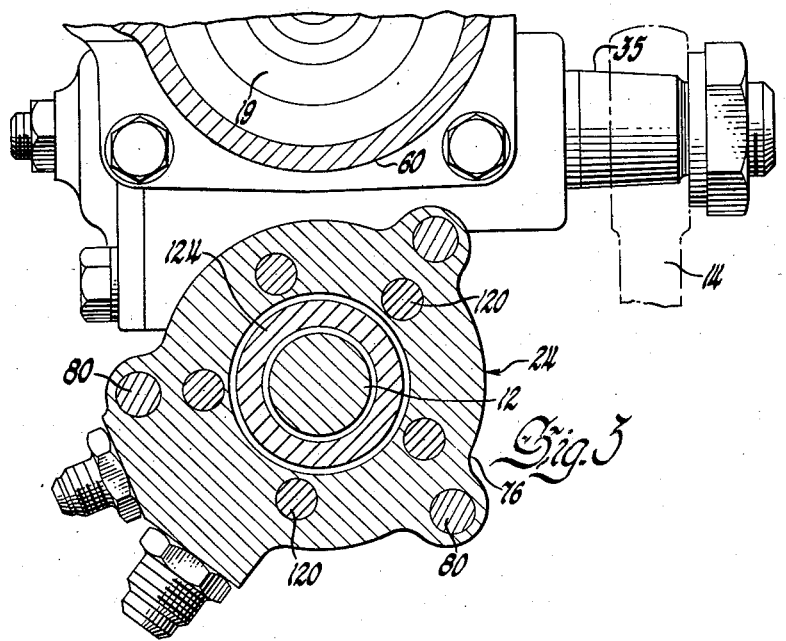

United States Patent Office 2,894,525
Patented July 14, 1959

2,894,525

COMBINED FLOW CONTROL AND RELIEF VALVE

William F. Erickson, Dayton, Ohio, assignor to General Motors Corporation, Detroit, Mich., a corporation of Delaware Application April 15, 1954, Serial No. 423,303

2 Claims. (Cl. 137—108)

This invention concerns a flow control and pressure relief device for fluid servo mechanisms and the like. Such device is considered particularly valuable as applied in fluid power steering systems and will be specifically described in that connection.

Fluid power steering systems conventionally comprise a constantly operated pump powered from the engine of the vehicle. This pump must supply such a delivery of fluid, with the vehicle standing and the engine idling, that a pressure can be quickly built up in a fluid motor, operably associated with a steering part, adequate to power the steering part so as to bring about turning of the dirigible wheels, which are maximally resistant to turning when not rotating. It necessarily follows that the delivery rate of the pump during periods of lesser steering resistance is in excess of demand. Accordingly, it is common to incorporate in the system a device serving to control the pump so that the same is caused to deliver fluid at a constant rate irrespective of the speed of the vehicle. It is further common to incorporate a relief valve in the system in order to reduce the pressure in the fluid motor whenever such pressure reaches an abnormal value, as when one of the dirigible wheels is being turned against a high curb, for example.

My invention has as its principal object to provide a device combining the functions of the two valves just discussed.

A further object is to provide a device of this character which is of simple design and therefore easily fabricated, assembled, and maintained.

Still other objects and features of the invention will be apparent from the following specific description, which will proceed with reference to the accompanying drawings wherein:

Figure 1 illustrates a power steering gear of a type to which the invention is applicable;

Figure 2 is an enlarged detail in section of the control valve component of the gear;

Figure 3 is a section on the line 3—3 in Figure 2;

Figure 4 is an enlarged longitudinal section through the combined flow control and pressure relief device; and Figure 5 is a section on the line 5—5 in Figure 4.

Referring first to Figure 1, it will be observed that the illustrated system includes a gear box or casing 10 confining means for translating the rotary motion of the steering shaft 12 into a rocking motion, manifested through the pitman or drop arm 14, operably connected to the drag link 16; a fluid motor 18 comprising a cylinder and a double acting piston 19; a pump 20, drawing from a reservoir 22; and an "open center" valve 24, controlling the flow of the fluid medium to the motor 18. A bracket mounting 26 secures the principal parts to the frame 28 of the vehicle.

While hydraulic operation of the gear is preferred, as indicated, the same may be adapted for vacuum operation or for operation by means of compressed air, if desired.

The means for attaining the desired rocking movement of the pitman arm 14, shown as having a ball and socket connection with the drag link 16, include a conventional ball nut 30, the rack teeth 32 of which engage with the teeth of one sector of a double sector gear 34 fixed to or integral with the cross shaft 35.

As well understood by those familiar with this art, the ball nut incident to the steering of the vehicle, is caused to move up or down on worm 38, integral with the shaft 12; the direction of movement of the nut being determined by the direction of rotation of the steering wheel 36 fixed to the upper end of the shaft.

Shaft 12 turns in needle bearings 40 at either end of the worm 38 and is supported for limited axial movement. The shaft is housed upwardly of the valve by a mast jacket 42, terminating at the base of the steering wheel.

The upper sector teeth of the double sector gear 34 within the casing 10 will be noted as meshing with the teeth of a rack 44 having a pin and yoke connection 37 with the shaft or stem 46 of the piston 19. An adjustor, generally indicated by the numeral 50, serves to maintain the rack and sector teeth in proper engagement.

Cylinder 60, within which the piston 19 is confined, is secured directly to the gear box 10. A circular adaptor plate 62 supplies a bearing for the piston shaft 46 and provides the necessary partition between the cylinder and gear box. Leakage at the flange face between the cylinder and gear box is prevented by an annular sealing ring 64. A similar sealing ring 65 surrounds the shaft 46 within the adaptor, which is annularly recessed to accommodate the ring.

Piston 19 carries a pair of piston rings 66 and has a recessed face, not shown, accommodating the boss portion 70 of the adaptor on full over leftward movement of the piston.

Control valve 24, which will now be described, is of the spool type and includes a housing 76 held fast to a flange portion 78 of the gear box 10 by bolts 80. These bolts pass through a flanged casing member 82 extending upwardly to join with the lower end of the mast jacket 42.

The valve housing 76 is internally bored and counterbored to form annular oil channels 84, 86 and 88. Channel 84 is open to a passageway 133 extending from the valve inlet port, while channels 86 and 88 connect through passageways 134 and 136, respectively, joining within the valve in a common passageway 138, with the line 92 terminating at the reservoir 22.

A spool element 98 confined within the housing 76 is made fast to the steering shaft 12, so as to participate in any axial movement thereof, by a nut 100 threaded on the shaft. This nut loads an upper thrust bearing 102 which, through the spool 98, loads a lower thrust bearing 104, in turn abutting an annular shoulder 106 formed incident to the fabrication of the steering shaft. Rollers 108 facilitate rotary movement of the steering shaft relative to the valve spool. The limits within which the steering shaft (or the valve spool) can move in an axial direction is set by the depth of the annular recesses 114 and 116 in the housing member 76.

The valve spool 98 is normally maintained in its centered position within the housing by means including a plurality of springs 118 (Figure 2) which operate to resist axial movement of the spool and steering shaft in either direction. These springs are housed between plunger pairs 120, abutting the inner ring components 110 and 112 of the thrust bearings. The springs and plunger pairs are contained in bores in the housing 76, five equi-spaced sets (Figure 3) being incorporated in the particular valve. Each of the bores opens to the annular channel 84 for a reason which will subsequently appear.

Spool 98 has a central land 122 and a pair of end lands 124 and 126 of the same diameter as the central land.

The central land 122 controls the fluid flow within the valve, annular channel 84 connecting with the inlet porting as previously described, while lands 124 and 126 are functional with respect to passageways 128 and 130, respectively. These latter passageways, as will be seen from Figure 1, interconnect the valve and the fluid motor, passageway 128 terminating at the right hand end of the cylinder 60, passageway 130 at the left hand end thereof. In this figure, to simplify an understanding of the invention, all of the internal passageways comprised in the system are shown diagrammatically and in certain instances out of true position. In the commerial gear open ends of the drilled lines that do not constitute part of the hydraulic circuit are closed by pressing a steel plug into the opening.

With the valve spool in its normal centered position, the hydraulic fluid from the pump 20, powered from the engine of the vehicle, as by belt and pulley, is divided into two streams at the central land 122. The stream diverted to the left flows across the annular channel mediate the central land and the end land 126, thence through the passageway 134 to the common return passageway 138. Similarly the stream diverted to the right flows across the annular space between the central land and the end land 124, thence through the passageway 136 to the passageway 138. Lines 128 and 130 being fully open when the valve spool is centered, both ends of the cylinder 60 are normally filled with fluid, maintained under a static pressure by the circulation of the fluid medium as just described.

As previously noted, the annular chamber 84 connecting with the inlet 133 from the pump is, at all times, open to the bores housing the springs 118. Thus, when the spool is moved axially to confine the fluid flow to one side or the other of the valve, the pressure which develops in such side (and in the corresponding chamber of the power cylinder) is applied in aid of the springs against the inner walls of the plungers 120. Accordingly, the resistance which must be overcome by the force tending to move the spool represents (disregarding friction) the sum of the force of the springs and the force of the developed pressure as applied to the plungers. This resistance may amount, for example, to from about two to eight pounds, being determined in any given case by the preloading of the springs 118 and is advantageous as providing a steering "feel" which would otherwise be lacking.

Going now to the improvement constituting the invention, it is highly important, as mentioned in the fore part hereof, that means be provided serving to maintain the output of the pump 20 constant and to reduce the pressure in the hydraulic circuit, should the same for any reason reach a value potentially damaging of any of the components of the system. To these ends, there is included in the system in series with the valve 24, a device 140 of a construction as shown in Figure 4 having a return line 142 to the pump 20.

In the indicated figure, the numeral 144 denotes a housing member of a generally cylindrical shape confining a piston-like element 146 having a closed right end 148. Such element is slidable within the housing within limits set by a stop 150 integral with a closure plug 152 threaded into the housing and the resistance of a spring 154 at the end of the element opposite the plug. This spring bears at its left-hand end against the flange portion 156 of a guide 158, the flange itself abutting a second closure plug 160, like plug 152 threaded into the housing 144.

Piston 146 is threaded at its left-hand end to receive a complementarily threaded member 162 having a portion 164 supplying a seat for a ball 166. This ball also seats against a hollow, spring-loaded plug 168 receiving the shank portion 170 of a stop, the flange portion 172 of which is maintained against the end portion 148 of the piston by the spring 174 which loads the plug 168.

Piston 146 is apertured at 176 and 178 for a reason which will subsequently appear.

A chamber 180 at the right-hand end of the piston receives the fluid from the pump 20 through a passageway 182. The fluid passes from the chamber through a restricted passageway 184 opening to a discharge passageway 186 connecting with the line 183 to the valve 24. A short passageway 188 branching from passageway 186 opens to the chamber 185 within which the spring 154 is housed. The previously mentioned return line 142 extending to the pump connects with a discharge passageway 190 communicating with an annular chamber 192 surrounding the piston 146.

The diameter of the restricted passageway 184 is such that there is no pressure drop across the same with the engine of the vehicle idling, i.e. with the pump 20 operating at its slowest rate. On an increase in engine speed a pressure promptly develops in the chamber 180 since the restricted passageway 184 cannot pass all of the fluid at the same rate that it enters the chamber. Piston 146 is accordingly shifted to the left against the resistance of the spring 154 to open the chamber (through the apertures 176) to the annular chamber 192 and hence, to the return line 142 to the pump 20. On subsequent reduction of the pressure in the chamber 180, the spring 154 operates to restore the piston to its neutral position so that, with the engine again at idling speed, chamber 180 is completely sealed off from chamber 192.

The previously identified parts housed within the piston 146 have relation to the relief valve function of the device. Thus, whenever the pressure in the fluid motor 18, and hence in the passageways 186 and 188 and the chamber 185 becomes excessive, the piston 146 will be forced rightward to the stop 150, whereafter the plug 168 will continue its rightward movement so that fluid is permitted to pass via passages 200 through the apertures 178 into the annular discharge chamber 192 for return to the pump 20. With the pressure relieved, the parts are returned to neutral relation by the pressure of the fluid in chamber 180.

To describe the general operation of the gear, let it be assumed that the vehicle is in motion and that the steering wheel 36 is rotated clockwise to negotiate a right turn. Clearly any resistance on the part of the cross shaft 35 to turning will be manifested in a reactionary axial thrust on the shaft 12 tending to cause longitudinal movement of the shaft. Now, if the resistance is less than the spring centering force (springs 118), no axial movement of the shaft and consequently no axial movement of the valve spool occurs, with the result that the vehicle is steered around the curve or corner solely by manual effort. On the other hand, if the resistance to turning of the shaft 35 is greater than the spring centering force, the steering shaft, and with it the spool 98, is caused to move axially downwardly to bring about partial or complete confinement of the fluid flow (depending upon the exact magnitude of the steering resistance) to the right-hand chamber of the cylinder and partial or complete closing of the passageway 136 which represents the exhaust line from such chamber. Piston 19 and rack 44 are consequently forced to the left to rock the cross shaft 35 in a counter-clockwise direction, this action being accompanied by exhaustion of fluid from the left chamber of the cylinder through the passageway 134. A steering linkage bringing about turning of the dirigible wheels of the vehicle to the right on rearward movement of the drag link 16 is, of course, assumed.

Should the steering shaft be rotated in a counter-clockwise direction to effect a leftward turning of the dirigible wheels, it should be clear that the action will be just the opposite of that above described.

Having thus described and illustrated my invention, what I claim is:

1. A combined flow control and relief valve assembly comprising with a body member including an inlet chamber, a return passage, and an outlet passage in communication with said inlet chamber having a restriction therein, a sleeve element subject to the pressure of fluid in said inlet chamber and displaceable to interconnect said chamber and said return passage when such pressure reaches a predetermined value, said sleeve element having associated therewith yieldable means operating to bias the same toward a normal position and having an opening therein communicating with said return passage, a tubular plunger within said sleeve element biased by yieldable means therewithin, said plunger being subject to the pressure of fluid in a second chamber provided by said body member, said second chamber having communication with said outlet passage, a valve element seated by said plunger, and a stop member within said sleeve element so arranged with respect to said valve element that when said plunger is displaced by the pressure of fluid in said second chamber it operates to remove said valve element from its seat, thereby to interconnect said second chamber and said return passage via said opening.

2. A combined flow control and relief valve assembly for use with power steering apparatus or the like which assembly comprises a body member having therein an inlet chamber, a return passage and an outlet passage in communication with said inlet chamber and including a restriction, a sleeve element housed by said body member having a closed portion constituting a wall of said inlet chamber and further having first and second radial passages therein, said first radial passage being located outwardly of said closed portion, said second radial passage being located inwardly thereof, yieldable means disposed in a second chamber in said body portion operating to bias said sleeve in a direction toward said first chamber, said second chamber being in communication with said outlet passage, a tubular plunger within said sleeve element backed by yieldable means carried between said plunger and said closed portion, a stop member reacting against said closed portion and having a stem extension accommodated within said plunger, and a valve element seated by said plunger and by means carried by said sleeve element, said valve assembly being characterized in operation in that when the fluid pressure in said inlet chamber reaches a predetermined value said sleeve is displaced to register said first radial passage with said return passage and in that when the pressure in said outlet passage downstream of said restriction reaches a predetermined value said plunger and said valve element are displaced against the resistance of said second-mentioned yieldable means so that said valve element is engaged by said stem extention, resulting in interconnecttion of said outlet passage and said return passage via said second radial passage.

References Cited in the file of this patent
UNITED STATES PATENTS

| | | |
|---|---|---|
| 2,603,065 | Sarto | July 15, 1952 |
| 2,665,704 | Kanuch | Jan. 12, 1954 |
| 2,737,196 | Eames | Mar. 6, 1956 |
| 2,768,582 | Klessig et al. | Oct. 30, 1956 |